United States Patent
Anderson et al.

(10) Patent No.: US 8,954,245 B2
(45) Date of Patent: *Feb. 10, 2015

(54) METHOD OF CONTROLLING GEAR RATIO RATE OF CHANGE IN CONTINUOUSLY VARIABLE TRANSMISSION

(75) Inventors: Randall Todd Anderson, Peoria, IL (US); Bradley John Will, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 295 days.

This patent is subject to a terminal disclaimer.

(21) Appl. No.: 13/349,776

(22) Filed: Jan. 13, 2012

(65) Prior Publication Data

US 2013/0184948 A1    Jul. 18, 2013

(51) Int. Cl.
*F16H 61/00*    (2006.01)

(52) U.S. Cl.
USPC .............................................. 701/55; 477/38

(58) Field of Classification Search
CPC . B60W 10/101; B60W 10/103; F16H 61/438; F16H 61/462
USPC .......................................................... 701/55
See application file for complete search history.

(56) References Cited

U.S. PATENT DOCUMENTS

| | | | |
|---|---|---|---|
| 4,082,013 A * | 4/1978 | Dornfeld et al. ................. | 477/68 |
| 4,103,489 A | 8/1978 | Fletcher et al. | |
| 4,107,776 A * | 8/1978 | Beale .............................. | 701/99 |
| 4,226,295 A | 10/1980 | Rembold et al. | |
| 4,353,272 A | 10/1982 | Schneider et al. | |
| 4,509,125 A | 4/1985 | Fattic et al. | |
| 4,641,553 A | 2/1987 | Kobayashi | |
| 4,938,101 A * | 7/1990 | Maki et al. ....................... | 60/446 |
| 5,009,129 A * | 4/1991 | Morimoto et al. ............... | 477/49 |
| 5,305,657 A * | 4/1994 | Bray et al. .................. | 74/336 R |
| 5,419,128 A * | 5/1995 | Asano et al. ..................... | 60/327 |
| 5,474,505 A | 12/1995 | Seidel et al. | |
| 5,636,119 A | 6/1997 | Coutant et al. | |
| 5,842,144 A * | 11/1998 | Coutant et al. .................. | 701/62 |
| 5,845,224 A | 12/1998 | McKee | |
| 5,860,891 A | 1/1999 | Bauerle | |
| 5,947,862 A | 9/1999 | Knapp et al. | |
| 6,157,884 A | 12/2000 | Narita et al. | |
| 6,361,471 B1 | 3/2002 | Heed | |
| 6,442,467 B1 | 8/2002 | Schuler et al. | |
| 6,487,485 B1 | 11/2002 | Henneken et al. | |
| 6,575,871 B2 | 6/2003 | Loeffler et al. | |
| 6,801,844 B2 | 10/2004 | Kawamura et al. | |

(Continued)

FOREIGN PATENT DOCUMENTS

EP        1452779        9/2004

*Primary Examiner* — Khoi Tran
*Assistant Examiner* — Ryan Rink
(74) *Attorney, Agent, or Firm* — Baker Hostetler

(57) ABSTRACT

A method for controlling a gear ratio rate of change in a machine having a continuously variable transmission includes moving an operator input device to a changed position, receiving electronic data indicative of the changed position, and determining a non-limited desired gear ratio based on the changed position. A maximum gear ratio rate of change corresponding to the non-limited desired gear ratio and an actual gear ratio of the continuously variable transmission is selected from an electronically stored gear ratio rate map. A current desired gear ratio is determined based on a previous desired gear ratio and the maximum gear ratio rate of change. A commanded gear ratio of the continuously variable transmission is changed to the current desired gear ratio using electronic signals.

13 Claims, 5 Drawing Sheets

(56) References Cited

U.S. PATENT DOCUMENTS

| | | |
|---|---|---|
| 6,814,687 B2 | 11/2004 | Jager et al. |
| 7,416,512 B2 | 8/2008 | Kobayashi et al. |
| 7,574,295 B2 | 8/2009 | Frances |
| 8,057,354 B2 * | 11/2011 | Frank et al. .................... 477/45 |
| 2007/0142167 A1 * | 6/2007 | Kanafani et al. ............... 477/37 |
| 2009/0149296 A1 | 6/2009 | Eastman et al. |
| 2009/0235655 A1 | 9/2009 | Koehler et al. |
| 2011/0048829 A1 | 3/2011 | Matsumoto et al. |
| 2012/0143451 A1 * | 6/2012 | Nishida et al. .................. 701/52 |
| 2013/0126257 A1 * | 5/2013 | Anderson et al. ............. 180/338 |
| 2013/0130865 A1 * | 5/2013 | Leidich et al. .................. 476/55 |
| 2013/0131937 A1 * | 5/2013 | Anderson et al. ............. 701/51 |

* cited by examiner

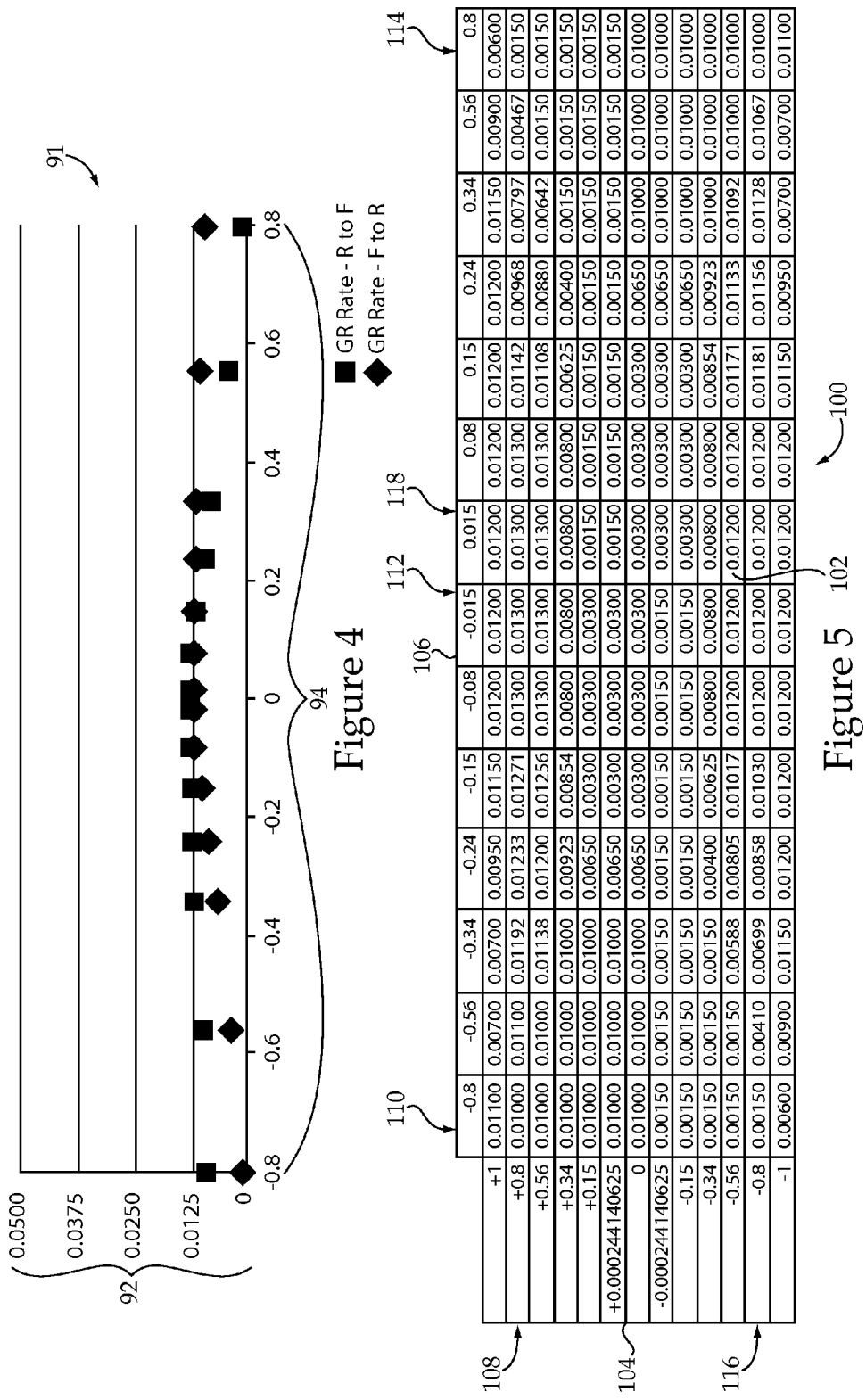

| 0 | 0.3 | 0.7881 | 1.6365 | 2.4246 |
|---|---|---|---|---|
| 0.008 | 0.03 | 0.078809 | 0.163647 | 0.163647 |

Figure 6

| 800 | 0.24 | 0.34 | 0.56 | 0.8 |
|---|---|---|---|---|
| 850 | 0.003 | 0.003 | 0.0045 | 0.01 |
| 900 | 0.004 | 0.0045 | 0.0065 | 0.011 |
| | 0.006 | 0.007 | 0.009 | 0.012 |
| 950 | 0.013 | 0.013 | 0.013 | 0.013 |

METHOD OF CONTROLLING GEAR RATIO RATE OF CHANGE IN CONTINUOUSLY VARIABLE TRANSMISSION

TECHNICAL FIELD

The present disclosure relates generally to a control system and method for a machine having a continuously variable transmission, and more particularly to a control system and method for limiting a gear ratio rate of change in the machine.

BACKGROUND

Many machines, including off-highway machines, are known to use continuously variable transmissions to drive the ground engaging elements, such as wheels or tracks, of the machine. For example, a hydrostatic drive system commonly includes at least one pump driven by a prime mover, such as an internal combustion engine, of the machine. The pump may be configured to drive one or more sets of motors, which, in turn, power the ground engaging elements of the machine. The pump, and/or motors, may provide variable displacement, such that a fluid flow between the components of the hydrostatic drive system may be adjusted while the machine is running As a result, direction, speed, and torque of the drive wheels may be continuously varied.

During a typical work cycle, an operator may choose to quickly change the direction, speed, and/or torque, as permitted by the hydrostatic drive system, in order to maximize efficiency in performance of the work cycle. For example, an operator may wish to drive toward a pile of materials at maximum speed, pick up a load of the materials, and quickly reverse away from the pile in order to transport the load to a new location. However, if the operator commands the hydrostatic drive system to accelerate, decelerate, or change directions too quickly, the components of the hydrostatic drive system may not be capable of such quick transitions and, as a result, the machine may jerk or lug. This sacrifice of smoothness for speed may result in a reduction of efficiency caused by, for example, discomfort and fatigue of the operator and/or spilling a portion of the load. Thus, operators may desire a balance of quick responsiveness of the hydrostatic drive system with smoothness in transitions of the hydrostatic drive system. U.S. Pat. No. 6,575,871 to Loeffler et al. teaches a method for controlling an adjusting speed of a shift operation in a continuously variable transmission. Specifically, Loeffler et al. appears to show the division of a shift operation into individual periods. During each period, a desired transmission ratio change is multiplied by a gradient, which is determined in dependence upon various influence quantities, to result in a dynamic desired transmission ratio. The current gear ratio is then transitioned to the dynamic desired transmission ratio at a constant adjusting speed.

The present disclosure is directed to one or more of the problems or issues set forth above.

SUMMARY OF THE DISCLOSURE

In one aspect, a method for controlling a gear ratio rate of change in a machine having a continuously variable transmission includes moving an operator input device to a changed position, receiving electronic data indicative of the changed position, and determining a non-limited desired gear ratio based on the changed position. A maximum gear ratio rate of change corresponding to the non-limited desired gear ratio and an actual gear ratio of the continuously variable transmission is selected from an electronically stored gear ratio rate map. A current desired gear ratio is determined based on a previous desired gear ratio and the maximum gear ratio rate of change. A commanded gear ratio of the continuously variable transmission is changed to the current desired gear ratio using electronic signals.

In another aspect, a machine having a continuously variable transmission includes ground engaging propulsion elements coupled with a machine frame, and an internal combustion engine supported on the machine frame. A continuously variable transmission is coupled with the internal combustion engine and is configured to drive the ground engaging propulsion elements. A gear ratio rate map providing maximum gear ratio rates of change corresponding to non-limited desired gear ratios and actual gear ratios is stored in a memory. An electronic controller includes the memory and is in communication with an operator input device and the continuously variable transmission. The electronic controller receives data indicative of a changed position of the operator input device, and determines a non-limited desired gear ratio based at least in part on the changed position. The electronic controller also selects a maximum gear ratio rate of change corresponding to the non-limited desired gear ratio and an actual gear ratio of the continuously variable transmission from the gear ratio rate map. A current desired gear ratio is determined based at least in part on a previous desired gear ratio and the maximum gear ratio rate of change. A commanded gear ratio of the continuously variable transmission is changed to the current desired gear ratio using electronic signals.

BRIEF DESCRIPTION OF THE DRAWINGS

FIG. 4 is a graph depicting maximum gear ratio rates of change versus actual gear ratios for a particular non-limited desired gear ratio, according to another aspect of the present disclosure;

FIG. 5 is a table of maximum gear ratio rates of change corresponding to non-limited desired gear ratios and actual gear ratios, according to another aspect of the present disclosure;

FIG. 6 is a table of maximum gear ratio rates of change for an initial step of a gear ratio change corresponding to actual gear ratios, according to another aspect of the present disclosure; and FIG. 7 is a table of maximum gear ratio rates of change having reduced values corresponding to actual gear ratios for particular desired engine speeds, according to another aspect of the present disclosure.

DETAILED DESCRIPTION

Figure 1:
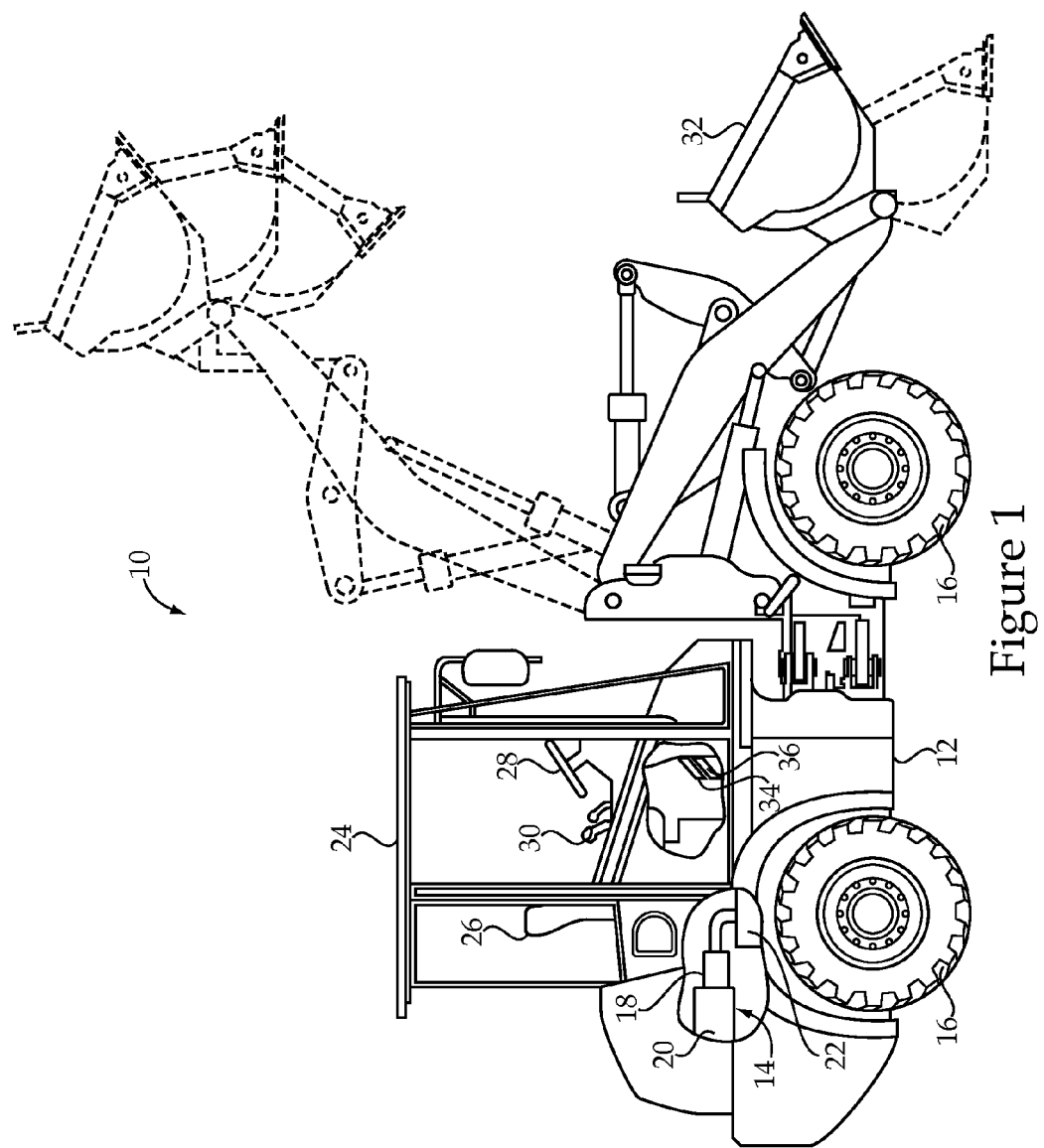
FIG. 1 is a side diagrammatic view of a machine having a continuously variable transmission, according to the present disclosure.

An exemplary embodiment of a machine 10 is shown generally in FIG. 1. The machine 10 may be a wheel loader, as shown, or any other off-highway or on-highway vehicle having a continuously variable transmission. Although the application is widely applicable to any machine having a continuously variable transmission, a machine having a hydrostatic drive system is shown. As such, machine 10 may also be referenced herein as a hydrostatic drive machine or, more specifically, a hydrostatic drive wheel loader. In the illustrated embodiment, machine 10 generally includes a frame 12 having a hydrostatic drive system 14 supported thereon for driving ground engaging elements 16, such as wheels (shown) or tracks, of the machine 10. A strategy presented herein for controlling the hydrostatic drive system 14 may be widely applicable to a machine having any continuously variable transmission and, therefore, it should be appreciated that the specific embodiments provided are presented for exemplary purposes only.

The hydrostatic drive system 14 may generally include at least one pump 18, such as a hydraulic pump, driven by a prime mover, such as a compression or spark-ignited internal combustion engine 20 or electric motor, of the machine 10. The pump 18 may be configured to drive at least one motor 22, such as one or more sets of hydraulic motors, which, in turn, power the ground engaging elements 16 of the machine 10. Each of the pump 18 and motor 22 may provide variable displacement, such that a fluid flow between the components of the hydrostatic drive system 14 may be adjusted while the machine 10 is running As a result, direction, speed, and torque of the ground engaging elements 16, or wheels, may be continuously varied.

An operator control station 24 may also be supported on the frame 12 and may include various controls and devices that may be used by an operator of the machine 10. For example, the operator control station 24 may include known devices, such as a seat assembly 26, a steering device 28, and one or more machine operation controllers. According to a specific example, a first machine operation controller 30, also referred to as a forward-neutral-reverse ("FNR") switch, may be provided for controlling directional movement of the machine 10, while a second machine operation controller may be provided for controlling operation of an implement 32, such as a bucket, of the machine 10. The operator control station 24 may include additional machine controllers, such as an accelerator pedal 34 for controlling engine speed, gear ratio, and rim pull, and a decelerator pedal 36 for reducing gear ratio and rim pull. According to some embodiments, the decelerator pedal 36 may also function as a service brake. Although separate controls are described for controlling direction of travel and speed of the machine 10, it should be appreciated that a single control, such as a lever, may be provided for controlling both machine speed and travel direction.

Figure 2:
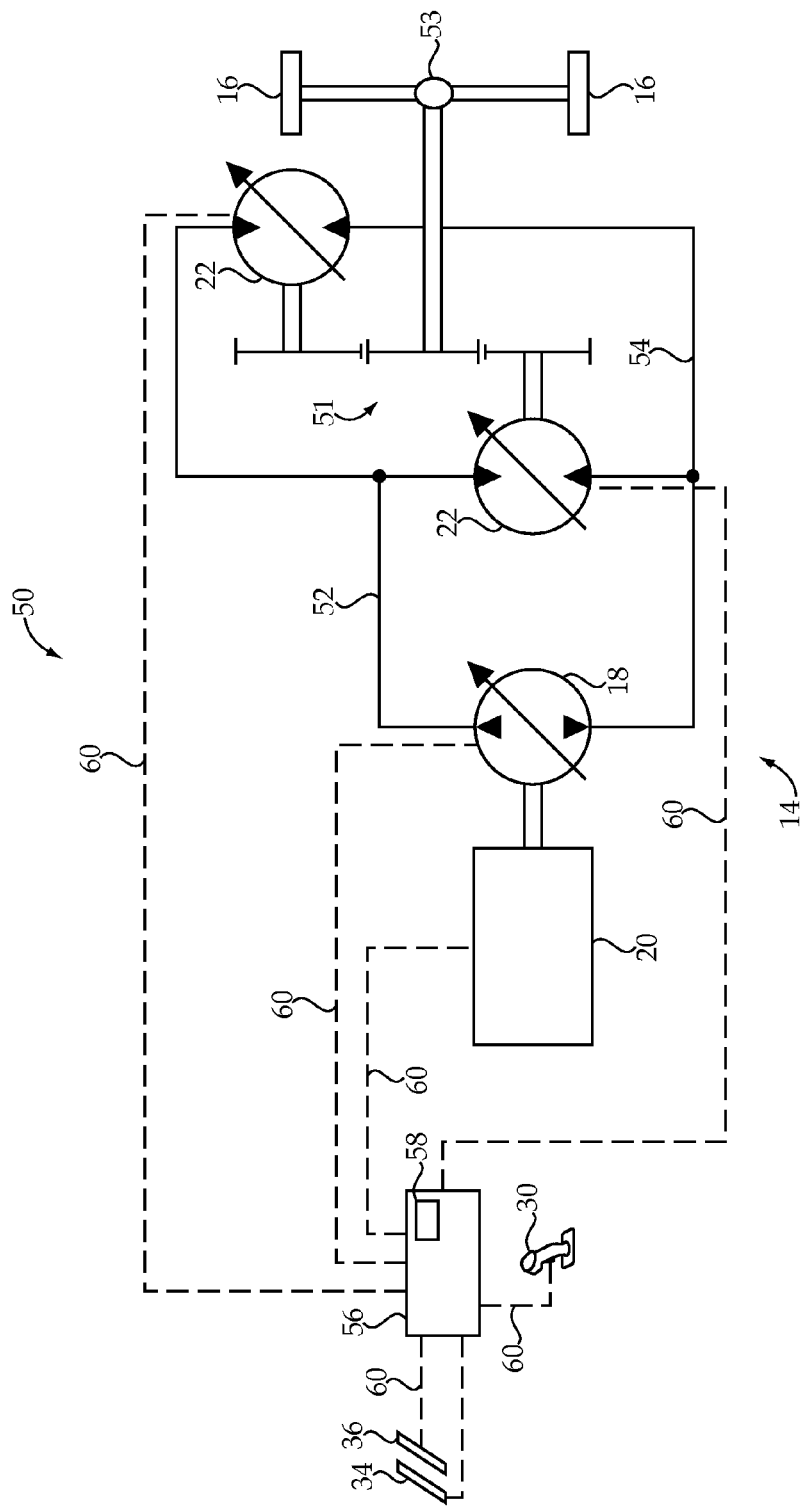
FIG. 2 is a schematic of a hydrostatic drive system of the machine of FIG. 1, according to one embodiment of the present disclosure.

A specific embodiment of the hydrostatic drive system 14 is shown in FIG. 2 to further describe a control system 50 of the hydrostatic drive machine 10. As shown, the hydrostatic drive system 14 may include at least one variable displacement pump 18 mechanically coupled to the internal combustion engine 20. The variable displacement pump 18 may include a bi-directional variable displacement swash plate pump, such that adjustment of the swash plate of the pump 18 may adjust the displacement thereof. It should be appreciated that the term "bi-directional" may refer to a pump that is capable of pumping fluid, such as hydraulic fluid, in either of two directions. As such, the angle of the swash plate may vary between first, or positive, displacement orientations, such as for forward travel of the machine 10, and second, or negative, displacement orientations, such as for reverse travel of the machine 10. It should be appreciated that a zero displacement, or swash plate angle of zero, may result in the pump 18 displacing no fluid while rotating and, thus, not driving the machine 10.

According to the exemplary embodiment, the variable displacement pump 18 may be fluidly coupled, such as in parallel, to a pair of variable displacement motors 22. It should be appreciated that the fluid coupling of the variable displacement motors 22 to the variable displacement pump 18 may allow the relative swash plate angle of the pump 18 to determine the direction and flow rate of the hydraulic fluid that is pumped to each motor 22. In addition, the displacements of the motors 22 may be similarly varied, by adjusting swash plate angles, between minimum and maximum displacements to adjust a torque delivered to the ground engaging elements 16. The motors 22, as should be appreciated, may also be bi-directional, as described with reference to the pump 18. However, uni-directional motors may also be used without deviating from the scope of the present disclosure.

As shown, each of the variable displacement motors 22 may be drivingly coupled with one of the ground engaging elements 16. More specifically, each of the variable displacement motors 22 may be configured to drive an axle shaft, which, in turn, may be configured to drive a gear mechanism 51. The gear mechanism 51 may be drivingly coupled with the ground engaging elements 16 through a differential 53. Therefore, pumping hydraulic fluid from the variable displacement pump 18 to the variable displacement motors 22 through a first set of fluid lines 52 may drive the ground engaging elements 16 in a first, or forward, direction of travel. The speed and torque, as should be appreciated, may be dependent upon the selected displacements of the respective pump 18 and motors 22. Pumping fluid in the opposite direction, through a second set of fluid lines 54, may drive the ground engaging elements 16 in a second, or reverse, direction of travel at a speed and torque determined by the displacements of the pump 18 and motors 22.

The control system 50, referenced above, may include at least one electronic controller 56 configured to control operation of the hydrostatic drive system 14. As such, the electronic controller 56 may also be referenced herein as a drive system electronic controller. Although a single electronic controller 56 is described, it should be appreciated that the control system 50 may include a plurality of electronic controllers. For example, an additional electronic controller may be provided for controlling operation of the internal combustion engine 20. As such, each electronic controller of the control system 50 may be configured to communicate laterally and/or in a hierarchical manner. Therefore, it should be appreciated that a variety of control systems 50, ranging from simple to complex, are contemplated for use with the present disclosure.

The electronic controller 56 may be of standard design and may include a processor, such as, for example, a central processing unit, a memory 58, and an input/output circuit that facilitates communication internal and external to the electronic controller 56. The processor may control operation of the electronic controller 56 by executing operating instructions, such as, for example, computer readable program code stored in memory 58, wherein operations may be initiated internally or externally to the electronic controller 56. A control scheme, an example of which is provided below, may be utilized that monitors outputs of systems or devices, such as, for example, sensors, actuators, or control units, via the input/output circuit to control inputs to various other systems or devices.

The memory 58 may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices. Such devices may be located internally or externally to the electronic controller 56. One skilled in the art will appreciate that any computer based system or device utilizing similar components for controlling the components of the hydrostatic drive system 14, is suitable for use with the present disclosure.

According to the exemplary embodiment, the electronic controller 56 may be in communication with at least the variable displacement pump 18 and the variable displacement motors 22. More specifically, for example, the electronic controller 56 may be in communication with the variable displacement pump 18 to adjust the swash plate angle thereof, resulting in the variable displacement described above. According to one embodiment, a pump displacement solenoid, such as a proportional solenoid, may be provided for varying the swash plate angle and controlling the direction of fluid flow. However, various means for adjusting displacement and fluid flow are known and may be incorporated into the present disclosure. Accordingly, the electronic controller 56 may issue pump displacement commands and/or additional commands, via wired or wireless communication lines 60, to the variable displacement pump 18 to effectively control the displacement and direction of fluid flow of the variable displacement pump 18.

Similarly, the electronic controller 56 may be in communication with the variable displacement motors 22 to adjust angles of the swash plates of the motors 22. Specifically, the electronic controller 56 may issue motor displacement commands via communication lines 60 to control the displacement of the respective variable displacement motors 22. Controlling the displacement of the variable displacement motors 22, using proportional solenoids or other similar devices, may allow for further speed adjustment and/or torque adjustment, as necessary to propel the hydrostatic drive machine 10. As stated above, devices for controlling displacement and fluid flow are generally known and, therefore, will not be discussed herein in greater detail.

The electronic controller 56 may also be in communication with the internal combustion engine 20 to control a speed thereof, such as, for example, by issuing control commands via communication lines 60 to control fueling to the internal combustion engine 20. The engine speed may be adjusted, at least in part, based on a position of a throttle and/or positions of one or both of the accelerator pedal 34 and decelerator pedal 36. Thus, the electronic controller 56 may also communicate with the accelerator and decelerator pedals 34 and 36 via communication lines 60 to detect or monitor positions, such as actuation amounts, of the pedals 34 and 36. Positions of the FNR switch 30 may also be monitored by the electronic controller 56 via communication lines 60 and used, along with additional inputs, including detected pedal positions, to control the direction of travel and ground speed of the hydrostatic drive machine 10. It should be appreciated that the control system 50 may include additional components and devices and may monitor additional inputs to control the hydrostatic drive system 14 as described herein.

Figure 3:
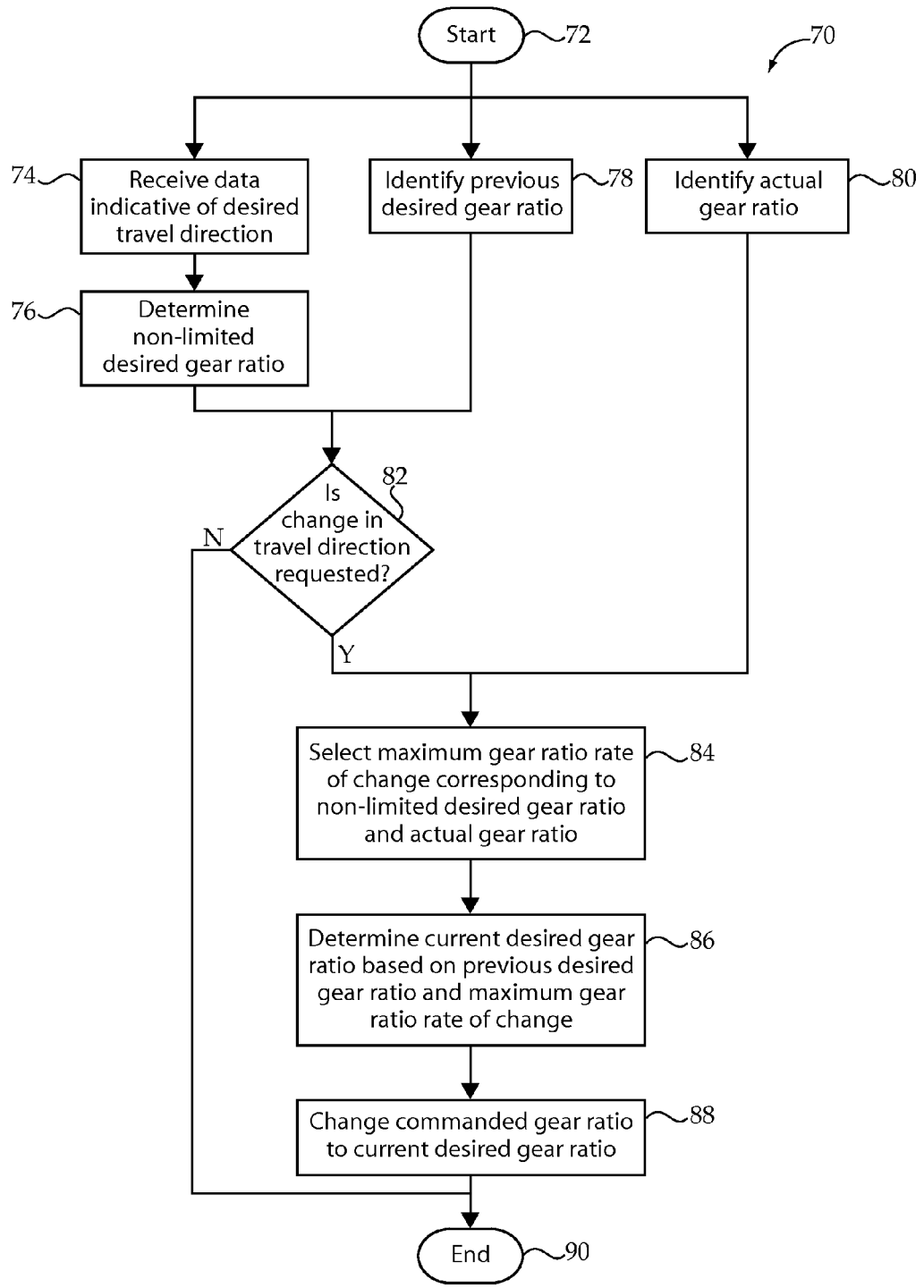
FIG. 3 is a logic flow chart of one embodiment of a method for controlling a gear ratio rate of change for a directional change in the hydrostatic drive machine of FIG. 1, according to one aspect of the present disclosure.

Turning to FIG. 3, there is shown a flow chart 70 representing an exemplary method for controlling an effective gear ratio rate of change for a directional change, or change in travel direction, in the hydrostatic drive machine 10, according to the present disclosure. The method may be implemented by the control system 50 of the machine 10. According to one example, the steps implementing the disclosed method may be in the form of computer readable program code stored in the memory 58 and executed by a processor of the electronic controller 56, or other computer usable medium. The method may run continuously or may be initiated in response to a predetermined event. According to one embodiment, the method may be initiated in response to a detected movement of one or more of the FNR switch 30, the accelerator pedal 34, the decelerator pedal 36, and other related input devices. However, it should be appreciated that while the electronic controller 56 may continuously monitor the positions of such devices, some gear ratio changes may only occur when the operator requests such changes, such as by actuating, for example, one or more of the FNR switch 30, accelerator pedal 34, and decelerator pedal 36.

The method begins at a START, Box 72. From Box 72, the method proceeds to Box 74, which includes the electronic controller 56 receiving electronic data indicative of a desired travel direction. For example, if the operator actuates the FNR switch 30, the electronic controller 56 may detect the actuated or changed FNR switch position and, using algorithms and reference data stored in memory 58, determine the desired travel direction indicated by the FNR switch 30. According to some embodiments, the electronic controller 56 may also receive electronic data indicative of positions, or changed positions, of the accelerator and decelerator pedals 34 and 36. These one or more changed positions may be used, at Box 76, to determine a non-limited desired gear ratio. The non-limited desired gear ratio, as described below, may be based at least in part on the desired travel direction, the accelerator and decelerator changed positions, and, further, may be based on a maximum allowed gear ratio. The maximum allowed gear ratio, according to some embodiments, may represent a fixed value set by the operator, such as via an additional operator input device. Thus, the non-limited desired gear ratio may represent a gear ratio requested by the operator, as indicated by operator inputs and machine settings, that is not limited in any way. As the method proceeds from Box 72 to Box 74 and Box 76, the method also proceeds from Box 72 to Box 78 to identify a previous desired gear ratio from a previous time step of the electronic controller 56. The method also proceeds from Box 72 to Box 80 to identify an actual gear ratio of the hydrostatic drive system 14. The actual gear ratio, according to some embodiments, may represent the current gear ratio being provided by the hydrostatic drive system 14 and, thus, may represent a ratio of current pump displacement to current motor displacement.

As used herein, the FNR switch 30, which may be a 3-position switch, may have a first, or central, position representing a neutral or stationary position of the hydrostatic drive machine 10. A second, or forward, position of the FNR switch 30 may represent a forward travel direction of the machine 10, while a third, or reverse, position of the FNR switch 30 may represent a reverse travel direction of the machine 10. With regard to the accelerator pedal 34, depressing the accelerator pedal 34 may command or request acceleration, or an increase in gear ratio, while releasing the accelerator pedal 34 may command or request deceleration, or a decrease in gear ratio. Regarding the decelerator pedal 36, depressing the decelerator pedal 36 may command or request deceleration, while releasing the decelerator pedal 36 may command or request acceleration. Together, positions of the FNR switch 30, the accelerator pedal 34, and the decelerator pedal 36 may reflect a net increase in gear ratio or a net decrease in gear ratio and, further, may indicate a desired direction of travel.

At Box 82, the electronic controller 56 may determine if a change in travel direction is requested by comparing the non-limited desired gear ratio, calculated at Box 76, to the previous desired gear ratio, identified at Box 78. As used herein, a change in travel direction may include a change from a forward travel direction to a reverse travel direction or, conversely, a change from a reverse travel direction to a forward travel direction. Changes in travel direction to or from a neutral or stationary position of the machine 10 are excluded from the exemplary method. However, alternative methods may include all direction changes, including those direction changes to and from the neutral position. If it is determined at Box 82 that a change in travel direction has been requested, the method proceeds to Box 84. If, however, a change in travel direction is not indicated, the method proceeds to an END, at Box 90.

A maximum gear ratio rate of change corresponding to the non-limited desired gear ratio and the actual gear ratio is then selected from a gear ratio rate map electronically stored in memory 58, as indicated at Box 84. An exemplary gear ratio rate map will be discussed in greater detail below with reference to FIG. 5. After the appropriate maximum gear ratio rate of change is selected, the method proceeds to Box 86, where a current desired gear ratio is determined based at least in part on the previous desired gear ratio and the maximum gear ratio rate of change. Specifically, the current desired gear ratio may represent an adjustment, such as an incremental adjustment, of the previous desired gear ratio, which may be the desired gear ratio value from the previous microprocessor loop, based on the maximum gear ratio rate of change. Thus a commanded gear ratio, which may represent the final gear ratio value translated into pump and motor displacement commands, may be adjusted toward the non-limited desired gear ratio, but remains limited by the non-limited desired gear ratio.

At Box 88, the hydrostatic drive system 14 or, more specifically, a commanded gear ratio of the hydrostatic drive system 14 is changed to the current desired gear ratio, using electronic signals, at least in part by changing a displacement of one of the variable displacement pump 18 and the at least one variable displacement motors 22. More specifically, the electronic controller 56 may change the commanded gear ratio of the hydrostatic drive system 14 to the current desired gear ratio described above by electronically controlling the components of the hydrostatic drive system 14. For example, the electronic controller 56 may use electronic signals to change displacements of the variable displacement pump 18 and/or variable displacement motors 22. After effecting the gear ratio change, the method proceeds to an END, at Box 90. However, as stated above, it should be appreciated that the method may run continuously and, thus, the electronic controller 56 may continuously adjust the gear ratio of the hydrostatic drive system 14.

Maximum gear ratio rates of change, as referenced above, may be stored in memory 58 and may be provided to correspond to particular non-limited desired gear ratios and actual gear ratios. For example, FIG. 4 depicts a graph 91 of maximum gear ratio rates of change 92 versus actual gear ratios 94 for a particular non-limited desired gear ratio. As shown, the maximum gear ratio rates of change 92 may increase as the actual gear ratio 94 approaches zero for both reverse to forward directional changes and forward to reverse directional changes.

Turning now to FIG. 5, an exemplary table 100 of maximum gear ratio rates of change 102 corresponding to non-limited desired gear ratios 104 and actual gear ratios 106 is shown. For example, and referring also to FIG. 4, an operator may manipulate the FNR switch 30, and one or more additional controllers, to indicate a non-limited desired gear ratio of 0.8. Maximum gear ratio rates of change 102 corresponding to a non-limited desired gear ratio of 0.8 are shown in row 108 of the table 100. As shown, if the operator has requested a directional change from reverse to forward and the actual, or current, gear ratio is −0.8, as shown in column 110, the corresponding maximum gear ratio rate of change 102 is 1.00. The maximum gear ratio rate of change 102 increases to 1.300 as the actual gear ratio 106 approaches 0, as shown in column 112, and decreases to 0.150 as the actual gear ratio 106 approaches 0.8, as shown in column 114. These maximum gear ratio rates of change are also shown plotted on the graph 91 of FIG. 4 for a directional change from reverse to forward.

According to another example, the operator may again manipulate the FNR switch 30 and one or more additional controllers to indicate a non-limited desired gear ratio of −0.8. Maximum gear ratio rates of change 102 corresponding to a non-limited desired gear ratio of −0.8 are shown in row 116 of the table 100. As shown, if the operator has requested a directional change from forward to reverse and the actual gear ratio 106 is 0.8, as shown in column 114, the maximum gear ratio rate of change 102 is 1.00. The maximum gear ratio rate of change 102 increases to 1.200 as the actual gear ratio 106 approaches 0, as shown in column 118, and decreases to 0.150 as the actual gear ratio 106 approaches −0.8, as shown in column 110. These maximum gear ratio rates of change 102 are also shown plotted on the graph 91 of FIG. 4 for a directional change from forward to reverse.

According to some embodiments, it may be desirable to increase the maximum gear ratio rates of change 102 for an initial step of a gear ratio change. Specifically, desirable performance characteristics may include at least a perception of near instantaneous responsiveness to a requested change in direction of travel. Thus, it may be desirable to increase the maximum gear ratio rates of change 102 for the initial step, which may be identified as the first time step of the electronic controller 56 after the gear ratio change is requested. As shown in FIG. 6, a table 130 may be provided that includes maximum gear ratio rates of change 132 for an initial step of a gear ratio change corresponding to actual gear ratios 134. According to a specific example, the maximum gear ratio rates of change 132 may be calculated by scaling the actual gear ratio 134 by a predetermined percentage, such as, for example, 10%, for the initial step.

According to an additional modification or enhancement, it may be desirable to determine if a desired speed of the internal combustion engine 20 is below a threshold value and, if so, reduce the maximum gear ratio rate of change, or provide values that are lower than the maximum gear ratio rates of change 102 of table 100. Specifically, for example, if the hydrostatic drive machine 10 is operating at high engine speed, or high throttle, and an operator requests a direction change and greatly reduces the throttle, or desired engine speed, it may be desirable to effect this direction change "softly," or more slowly. Thus, as shown in FIG. 7, a table 140 may be provided that includes maximum gear ratio rates of change 142 having reduced values corresponding to actual gear ratios 144 for particular desired engine speeds 146.

It should be appreciated that the method described herein is provided to describe an exemplary control strategy and, thus, implementation details may vary greatly depending on the particular application. Further, it should be appreciated that specific values provided herein, such as values corresponding to the maximum gear ratio rates of change, are provided for exemplary purposes only. Such values may be arrived at through testing and, further, may be selected to provide desired performance characteristics. According to a specific embodiment, it may be desirable to select values that simulate powershift or torque converter operation. That is, for example, desirable performance may include, for example, limiting a non-limited desired gear ratio. Further, desirable performance may include increasing a rate of change during directional changes as the actual gear ratio approaches zero.

INDUSTRIAL APPLICABILITY

The present disclosure finds potential application in any machine that utilizes a continuously variable transmission. Further, the disclosure may be specifically applicable to hydrostatic drive machines utilizing one or more variable displacement pumps configured to drive one or more variable displacement motors. Yet further, the present disclosure may be applicable to strategies for controlling gear ratio rates of change during directional changes in hydrostatic drive machines. Such machines may include, but are not limited to, off-highway machines, such as wheel loaders, and other machines known in the art.

Referring generally to FIGS. 1-7, a hydrostatic drive machine 10 may include a hydrostatic drive system 14 including at least one variable displacement pump 18 mechanically coupled to an internal combustion engine 20. The variable displacement pump 18 may be fluidly coupled to a pair of variable displacement motors 22, which, in turn, are drivingly coupled with ground engaging elements 16 of the machine 10 via a gear mechanism 51 and differential 53. A control system 50, including at least one electronic controller 56, may be provided for controlling operation of the hydrostatic drive system 14, including executing a method for controlling a gear ratio rate of change for directional changes of the machine 10.

During typical operation of the hydrostatic drive machine 10, the operator may move one or more of an FNR switch 30, accelerator pedal 34, decelerator pedal 36, and other machine operation controllers to command a desired operation of the machine 10. As shown in the flow chart 70 of FIG. 3, the electronic controller 56 may receive electronic data indicative of a desired travel direction (Box 74) and a request for acceleration or deceleration and, using at least that information, may determine a non-limited desired gear ratio (Box 76). The electronic controller 56 may determine if a change in travel direction is requested by comparing the non-limited desired gear ratio to a previous desired gear ratio (Box 82). If the change in travel direction is requested, a maximum gear ratio rate of change corresponding to the non-limited desired gear ratio and an actual gear ratio is selected from a gear ratio rate map, such as map 100, electronically stored in memory 58 (Box 84). After the appropriate maximum gear ratio rate of change is selected, a current desired gear ratio is determined based at least in part on the previous desired gear ratio and the maximum gear ratio rate of change (Box 86). The hydrostatic drive system 14 or, more specifically, a commanded gear ratio of the hydrostatic drive system 14 is then changed to the current desired gear ratio, using electronic signals, at least in part by changing a displacement of one of the variable displacement pump 18 and the at least one variable displacement motors 22 (Box 88).

Thus, the control strategy described herein provides a means for effectively controlling the gear ratio rate of change by incrementally adjusting the commanded gear ratio toward the non-limited desired gear ratio. Specifically, the control strategy transitions the hydrostatic drive system to current desired gear ratios based on direction changes, as described herein. The control strategy provides a means for more smoothly controlling gear ratio changes in hydrostatic drive machines and, further, may allow the performance of the hydrostatic drive system to simulate powershift or torque converter operation during changes in travel direction.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

The invention claimed is:

1. A method of controlling a gear ratio rate of change in a machine having a continuously variable transmission that includes a variable displacement pump fluidly connected to at least one variable displacement motor, the method comprising steps of:
    moving an operator input device to indicate a desired travel direction;
    receiving electronic data indicative of the desired travel direction with an electronic controller;
    determining a non-limited desired gear ratio based at least in part on the desired travel direction with the electronic controller;
    determining if a change in travel direction is requested by comparing the non-limited desired gear ratio to a previous desired gear ratio;
    selecting a maximum gear ratio rate of change corresponding to the non-limited desired gear ratio and an actual gear ratio of the continuously variable transmission from an electronically stored gear ratio rate map of the electronic controller;
    determining a current desired gear ratio based at least in part on the previous desired gear ratio and the maximum gear ratio rate of change with the electronic controller; and
    changing a commanded gear ratio of the continuously variable transmission to the current desired gear ratio using electronic signals of the electronic controller;
    wherein a current gear ratio of the continuously variable transmission is represented by a current pump displacement and a current motor displacement, and wherein performing the steps of selecting the maximum gear ratio rate of change, determining the current desired gear ratio, and changing the commanded gear ratio is responsive to a change in travel direction request from a forward travel direction to a reverse travel direction or the reverse travel direction to the forward travel direction.

2. The method of claim 1, further including providing maximum gear ratio rates of change in the gear ratio rate map that increase as the actual gear ratio approaches zero.

3. The method of claim 1, further including:
    determining if the changing step is an initial step in a gear ratio change; and
    increasing the maximum gear ratio rate of change for the initial step.

4. The method of claim 3, wherein the increasing step includes scaling the actual gear ratio by a predetermined percentage for the initial step.

5. The method of claim 1, further including:
    determining if a desired engine speed is below a threshold value; and
    reducing the maximum gear ratio rate of change if the desired engine speed is below the threshold value.

6. A machine having a continuously variable transmission, comprising:
    a machine frame;
    ground engaging propulsion elements coupled with the machine frame;
    an internal combustion engine supported on the machine frame;
    a continuously variable transmission that includes a variable displacement pump coupled with the internal combustion engine and fluidly connected to at least one variable displacement motor configured to drive the ground engaging elements;

an operator input device;

a memory storing a gear ratio rate map providing maximum gear ratio rates of change corresponding to non-limited desired gear ratios and actual gear ratios; and an electronic controller including the memory and in communication with the operator input device and the continuously variable transmission, wherein the electronic controller:

receives electronic data indicative of a desired travel direction from the operator input device, determines a non-limited desired gear ratio based at least in part on the desired travel direction, determines if a change in travel direction is requested by comparing the non-limited desired gear ratio to a previous desired gear ratio, selects a maximum gear ratio rate of change corresponding to the non-limited desired gear ratio and an actual gear ratio of the continuously variable transmission from the gear ratio rate map, determines a current desired gear ratio based at least in part on the previous desired gear ratio and the maximum gear ratio rate of change, and changes a commanded gear ratio of the continuously variable transmission to the current desired gear ratio using electronic signals;

wherein a current gear ratio of the continuously variable transmission is represented by a current pump displacement and a current motor displacement, and wherein the electronic controller selects the maximum gear ratio rate of change, determines the current desired gear ratio, and changes the commanded gear ratio responsive to a change in travel direction request from a forward travel direction to a reverse travel direction or the reverse travel direction to the forward travel direction.

7. The machine of claim 6, wherein the gear ratio rate map includes maximum gear ratio rates of change that increase as the actual gear ratio approaches zero.

8. The machine of claim 6, wherein the electronic controller:

determines if the changing step is an initial step in a gear ratio change; and increases the maximum gear ratio rate of change for the initial step.

9. A machine having a continuously variable transmission, comprising:

a machine frame;

ground engaging propulsion elements coupled with the machine frame;

an internal combustion engine supported on the machine frame;

a continuously variable transmission that includes a variable displacement pump coupled with the internal combustion engine and fluidly connected to at least one variable displacement motor configured to drive the ground engaging elements;

an operator input device;

a memory storing a gear ratio rate map providing maximum gear ratio rates of change corresponding to non-limited desired gear ratios and actual gear ratios; and an electronic controller including the memory and in communication with the operator input device and the continuously variable transmission, wherein the electronic controller receives electronic data indicative of a changed position of the operator input device, determines a non-limited desired gear ratio based at least in part on the changed position, selects a maximum gear ratio rate of change corresponding to the non-limited desired gear ratio and an actual gear ratio of the continuously variable transmission from the gear ratio rate map, determines a current desired gear ratio based at least in part on a previous desired gear ratio and the maximum gear ratio rate of change, and changes a commanded gear ratio of the continuously variable transmission to the current desired gear ratio using electronic signals; and wherein a current gear ratio of the continuously variable transmission being represented by a current pump displacement and a current motor displacement, wherein the electronic controller: determines if the changing step is an initial step in a gear ratio change; and increases the maximum gear ratio rate of change for the initial step;

wherein the electronic controller scales the actual gear ratio by a predetermined percentage for the initial step.

10. The machine of claim 6, wherein the electronic controller:

determines if a desired engine speed is below a threshold value; and reduces the maximum gear ratio rate of change if the desired engine speed is below the threshold value.

11. The machine of claim 9, wherein the gear ratio rate map includes maximum gear ratio rates of change that increase as the actual gear ratio approaches zero.

12. The machine of claim 9, wherein the electronic controller:

determines if the changing step is an initial step in a gear ratio change; and increases the maximum gear ratio rate of change for the initial step.

13. The machine of claim 9, wherein the electronic controller:

determines if a desired engine speed is below a threshold value; and reduces the maximum gear ratio rate of change if the desired engine speed is below the threshold value.

* * * * *